OR 3,832,027

7 3047 H

United States Patent

X 3055 T

X 3056 E

King

[11] 3,832,027

[45] Aug. 27, 1974

[54] SYNTHETIC HOLOGRAM GENERATION FROM A PLURALITY OF TWO-DIMENSIONAL VIEWS

[75] Inventor: Michael C. King, Basking Ridge, N.J.

[73] Assignee: Bell Telephone Laboratories, Incorporated, Murray Hill, N.J.

[22] Filed: Mar. 12, 1969

[21] Appl. No.: 806,661

[52] U.S. Cl. ........ 350/3.5
[51] Int. Cl. ........ G02b 27/00
[58] Field of Search ........ 350/3.5, 117

[56] References Cited

UNITED STATES PATENTS 3,501,230 3/1970 Johnston ........ 350/117

OTHER PUBLICATIONS

Pole, IBM Tech. Disc. Bulletin, Vol. 10, No. 5, pp. 598–600, (10/1967).

McCrickerd et al., Applied Physics Letters, Vol. 12, No. 1, pp. 10–12 (1/1968).

Noll, "Stereographic Projections by Digital Computer," Computers and Automation, pp. 32–34 (5/1965).

Lesem et al., "Computer Synthesis of Holograms for 3-D Display," Communications of the ACM, Vol. 11, No. 10 (10/1968).

*Primary Examiner*—Ronald J. Stern
*Attorney, Agent, or Firm*—F. E. Morris; R. B. Anderson

[57] ABSTRACT

A three-dimensional computer display system is described that allows one to generate holograms of computer stored information without having to calculate the hologram. The system uses a computer to calculate and a microfilm plotter to display a multitude of two-dimensional views of a three-dimensional object stored in a computer. These views in turn are recorded sequentially to form a composite hologram comprised of many smaller holograms. While satisfactory images can be reconstructed from such a hologram simply by using a penlight in combination with a monochromatic filter, much better images can be reconstructed in white light from an image hologram formed from the composite hologram.

9 Claims, 8 Drawing Figures

INVENTOR
M. C. KING
BY Francis E. Morris
ATTORNEY

PATENTED AUG 27 1974

3,832,027

SHEET 2 OF 4

PATENTED AUG 27 1974 3,832,027

SHEET 3 OF 4

SYNTHETIC HOLOGRAM GENERATION FROM A PLURALITY OF TWO-DIMENSIONAL VIEWS

BACKGROUND OF THE INVENTION

This invention is related to information display and in particular to the three-dimensional display of information generated by a computer. A related patent describing a technique for creating a three-dimensional display is that of M. C. King, number 3,547,511 issued Dec. 15, 1970 and assigned to Bell Telephone Laboratories, Incorporated now U.S. Pat. No. 3,547,511.

An especially convenient form of output from a computer is a visual display because such a display enables the viewer to grasp quickly and easily the relationships between large amounts of data. Moreover, if the display is real-time, the computer user is also able to interact with the computer by varying the parameters of his calculations and observing how these variations affect the output projected on the visual display in front of him. Typically, visual display is effected by modulating an electron beam projected onto a cathode ray tube (CRT) or by illuminating a microfilm that was produced in a microfilm plotter by photographing a CRT trace. Both techniques are well known in the art and have been extensively described in the literature. See, for example, C. Machover, "Graphic CRT Terminals — Characteristics of Commercially Available Equipment," *Proceedings of the* 1967 *Fall Joint Computer Conference*, page 149; C. Christensen and E. Pinson, "Multi-function Graphics for a Large Computer System," Ibid., page 697; and the equipment manuals of computer manufacturers.

Although the convenience of such visual displays makes them very attractive, visual displays typically have only limited flexibility and what flexibility they do have is often purchased with expensive computer processing time. Thus, it is often difficult or confusing to plot and view information on more than two axes; and although computer programs have been developed to reduce these problems by permitting the user to rotate the axes of the plot and thereby change the point at which the plot is viewed, each rotation of the axis essentially requires a recomputation of all the points in the display. Such an exercise is, of course, expensive.

Often more expensive, however, is the alternative technique of first forming with the computer a hologram of the information to be displayed and then viewing the hologram. As is well known, computer generated holograms have been produced by calculating the wavefront that emerges from an imaginary object. The standing wave pattern formed by the interference of this wavefront with an imaginary reference beam is then determined; and this pattern is magnified and plotted on a CRT. The plot, in turn, is photographed and reduced in size to form the desired hologram. When this hologram is illuminated, the viewer is able to observe an image of the information recorded on the hologram. Such an image can usually be rotated through about 20° simply by changing the position at which the hologram is viewed. To generate such a hologram, however, it is usually necessary to compute a Fourier transform for every discrete point in the hologram. And because the computation of a Fourier transform is rather intricate, even for simple holograms having only $10^6$ points the computation time is up to 30 minutes. High quality holograms of complex subjects, however, require up to $10^9$ points. Further details on computer-generated holograms are disclosed by L. B. Lesem, P. M. Hirsch and J. A. Jordan, Jr. in "Computer Synthesis of Holograms for 3-D Display," *Communications of the ACM*, Volume 11, No. 10, page 661 (Oct., 1968) and by the authors of several papers referenced therein.

SUMMARY OF THE INVENTION

Accordingly, it is an object of this invention to provide a convenient three-dimensional display of information.

And, more particularly, it is an object of this invention to provide a permanent and inexpensive three-dimensional display of information generated by a computer.

These and other objects of the invention are achieved with a computer display system that uses a computer to calculate and a microfilm plotter to display a multitude of two-dimensional views of whatever three-dimensional objects is to be displayed. These views are then recorded sequentially by known holographic techniques to form a composite hologram comprised of many smaller holograms. Illustratively, images can then be reconstructed from such a hologram simply by using a penlight and a monochromatic filter. Much better images, however, can be reconstructed — and in white light — if the composite hologram is used to form an image hologram and the image is reconstructed from the image hologram.

Because the computer is used to do only what it does best, namely, calculate two-dimensional views of an object, the amount of computer time required in forming the hologram can be less than 20 seconds in contrast to the hours required to computer generate a high quality hologram by prior art techniques.

BRIEF DESCRIPTION OF THE DRAWING

These and other elements, features and objects of my invention will be more readily understood from the following detailed description of the invention taken in conjunction with the following drawing in which.

DETAILED DESCRIPTION OF THE DRAWING

For the uses presently contemplated for my system for forming holograms of computer-stored information, such information would ordinarily comprise the ordered data necessary to define and interrelate points, lines and surfaces in space. Thus, the information would typically be stored in the computer in the form of a multitude of triplets of numbers, each such triplet representing a single point in space that is either a point or a part of a line or a surface. Because this information ordinarily can be represented as having physical shape, I will refer to it below as information about an object, and I will also write of forming a hologram containing information about an object. It must be remembered, however, that the object only exists as a mathematical description in the computer memory and need have no other physical existence.

Figure 1:
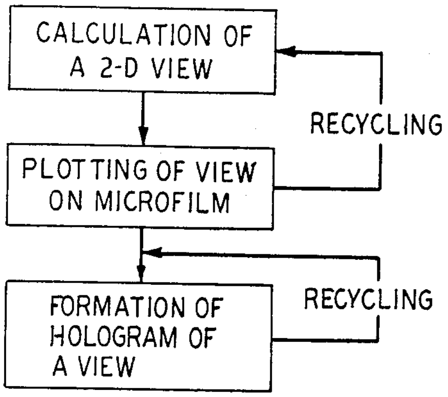
FIG. 1 describes my invention in block form.

Turning now to FIG. 1, there is shown in block form the system I have discovered. In the first step, the computer calculates from the information stored in it a two-dimensional view of the object represented by the information. A microfilm plotter then draws this view on a microfilm frame. Next a new view is computed; and it, in turn, is plotted on a new microfilm frame. And this process is repeated for as many cycles as is necessary to produce all the views desired of the object. Ordinarily, it is preferable to compute each view as though it were located adjacent the view computed just before it; and such a pattern of views will be assumed throughout the remainder of my description of the invention.

Once all the views have been recorded, the microfilm is developed and fed into a projector. The first frame is then illuminated by coherent light and imaged by a lens onto a diffuse screen. The light from the screen is next incident on a small portion of a photosensitive medium where it interferes with a phase-related reference beam of coherent light to form an interference pattern that is recorded by the photosensitive medium. This interference pattern is a hologram. This process is then repeated for each of the remaining frames, each hologram being recorded on a different portion of the recording medium. Typically, the portion of the photosensitive medium that is exposed during each recording is defined by an aperture in an otherwise opaque mask; and this mask is simply stepped from one portion of the medium to another between exposures. Ordinarily, because successive frames contain adjacent views and because these adjacent views must be recorded next to each other on the photosensitive medium for reasons that will be detailed below, the distance the mask is stepped is simply the width of its aperture in the direction of stepping. This hologram recording technique is similar to techniques described in my copending patent application referenced above.

Once each hologram is recorded, the photosensitive medium is developed if necessary; and the record on the photosensitive medium, which will be called a composite hologram, is then ready for use. It can be viewed with monochromatic light, obtained, for example, by filtering the light from a penlight or a tensor lamp; or, more preferably, an image hologram can be made from the composite hologram and the image hologram can be viewed in white light.

Figure 2:
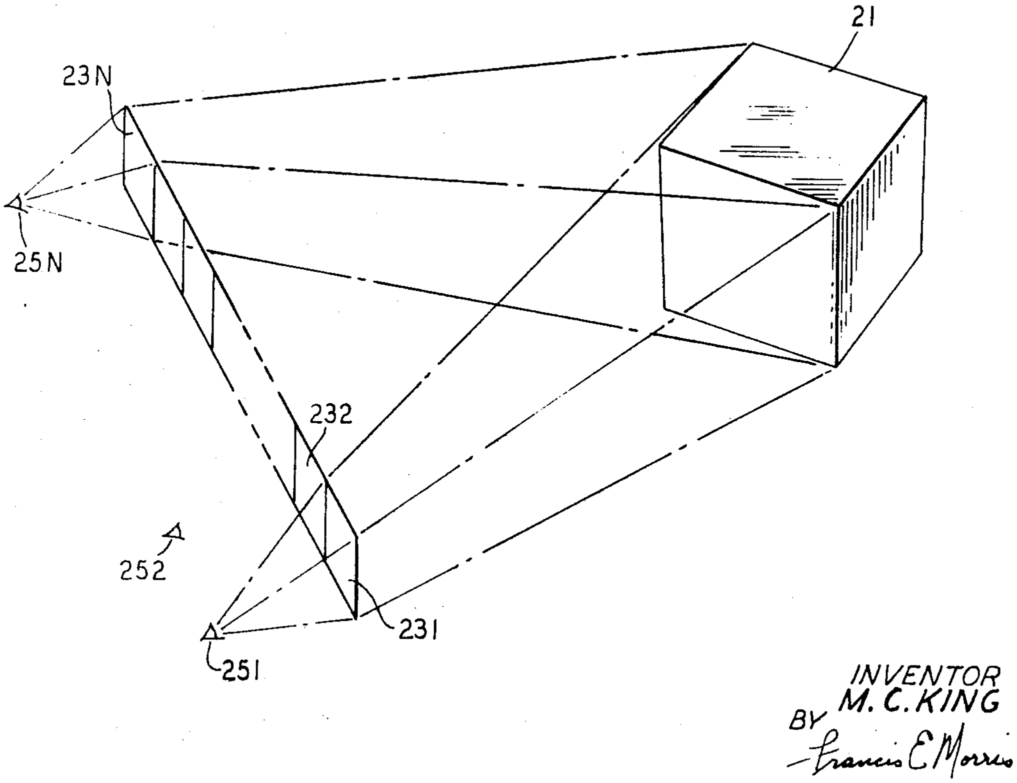
FIG. 2 is a schematic illustration of the calculations executed by a computer.

The calculation of each two-dimensional view and the plotting of each view on microfilm follows techniques well known in the art. For example, extensive details on some methods for calculating these views are given by R. A. Weiss in "BE VISION, A Package of IBM 7,090 FORTRAN Programs to Draw Orthographic Views of Combinations of Plane and Quadric Surfaces," *Journal of the Association for Computing Machinery*, Volume 13, No. 2, page 194 (Apr., 1966) and by A. M. Noll in "Stereographic Projections by Digital Computer," *Computers and Automation*, Volume 14, page 32 (May, 1965). In the interests of brevity, the calculation technique I have used will be summarized with the aid of FIG. 2. First, I store in the computer a multitude of triplets of numbers that specify the shape of the object I am interested in by specifying a multitude of points in that object. This storage can be accomplished simply by reading the numbers into the computer or by deriving the numbers from other calculations of the computer. For purposes of illustration, assume that these numbers represent object 21 of FIG. 2. Next, I calculate a series of views of the object. To do this, I first choose the points 251, 252, . . . , 25N from which the object is viewed. Each such viewpoint represents a possible location of an eye of the viewer and determines the angle at which the object is viewed. Typically, these points are separated by fractions of a degree. For each such viewpoint, I then draw by analytic methods lines from the points in the object to the viewpoint; and I determine the points of intersection of these lines with a picture plane that is inserted between the object and the viewpoint. In FIG. 2, these picture planes are shown as elements 231, 232, . . . , 23N; and the points of intersection of the planes with the lines comprise the two-dimensional views or projections that are plotted by the microfilm plotter.

Preferably, the picture planes are located one right next to the other with no intervening spaces and have a rectangular shape. Ordinarily, all the picture planes are located in the same plane; but other configurations can be used if the complications and possible distortions that may result can be tolerated or compensated for.

Figure 3:
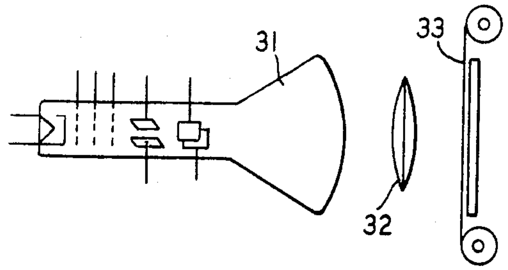
FIG. 3 is a schematic illustration of a microfilm plotting system.

After it is calculated, each view is recorded on microfilm simply by photographing with appropriate optics the CRT trace produced when an electron beam is modulated by a signal representative of a particular view of the object. For convenience in aligning the various holograms of these views, it is advantageous that the views at adjacent picture planes be stored in adjacent frames of the microfilm. A schematic of an illustrative microfilm plotting system is shown in FIG. 3. This system is comprised of a cathode ray tube 31, an imaging system represented by lens 32 and a strip of microfilm 33. As each view is formed on the screen of tube 31, it is imaged onto a portion of microfilm 33 where it is recorded. Between the projection of each view onto film 33 the film is advanced enough to prevent double exposure. As a result, there is recorded on the strip of microfilm a series of different computer-generated views of the object represented by the mathematical description that is stored in the computer. Illustratively, the first of these views is the rightmost view of the object and each succeeding view is a little more to the left side of the object, as shown in FIG. 2.

Figures 4, 5:
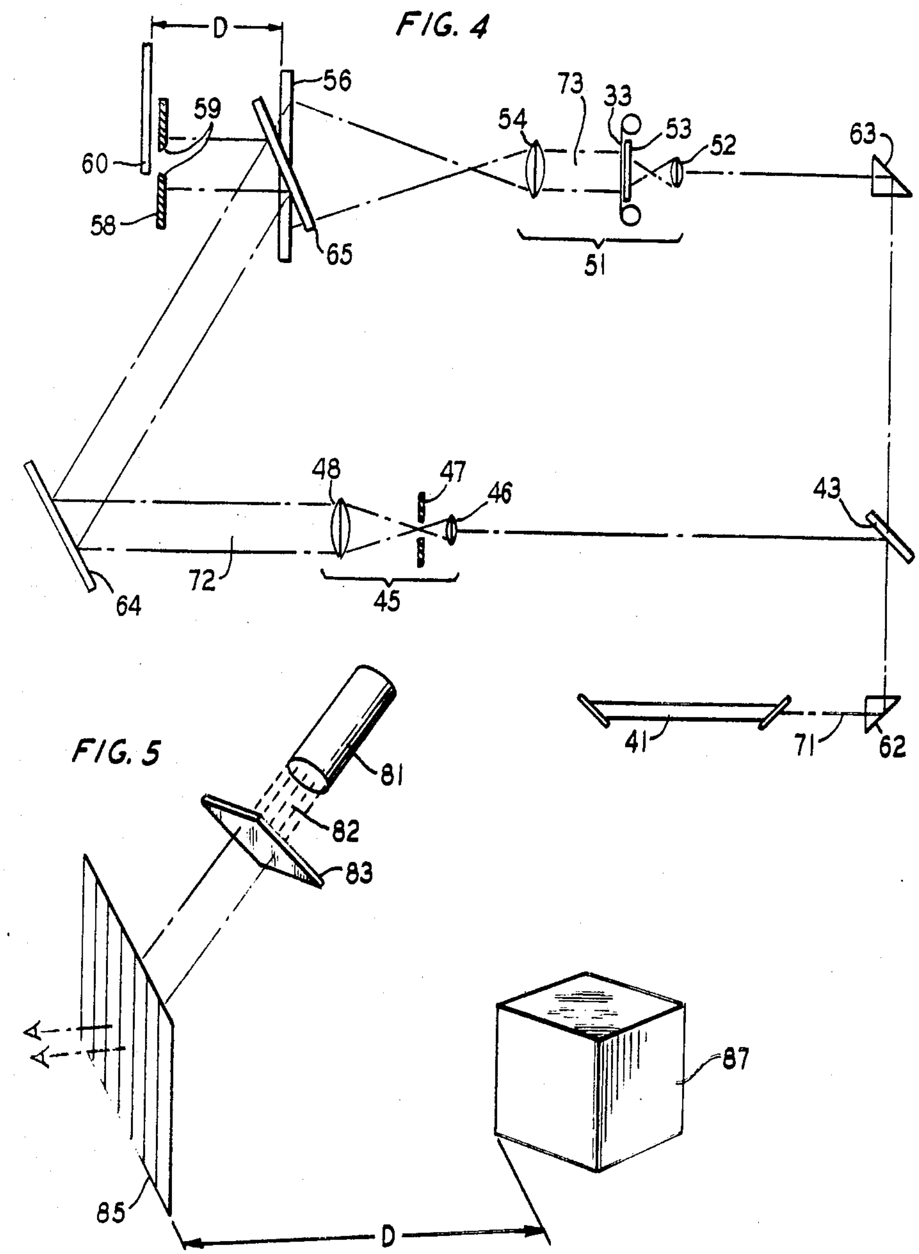
FIG. 4 is a schematic illustration of a hologram forming system.
FIG. 5 is a schematic illustration of a hologram viewing system.

Once the microfilm has been developed it is inserted into the hologram forming system shown in FIG. 4. This system is comprised of a laser 41, a beam splitting mirror 43, a collimating system 45, a projector 51, a planar diffuse screen 56, an opaque mask 58 with a single vertical slit 59 perpendicular to the plane of the drawing, and a photosensitive recording medium 60. In addition, reflecting prisms 62 and 63 and mirrors 64 and 65 are used to redirect light from laser 41. Note that mirror 65 is located above diffuse screen 56. Collimating system 45 typically is comprised of an objective lens 46, a pinhole 47 and a collimating lens 48; and projector 51 is comprised of an objective lens 52, a film carriage 53 on which is transported film 33, and a projecting lens 54.

Slit 59 has a width of 1 to 3 millimeters in the plane of the drawing and a height, for example, of 10 centimeters.

To record a hologram of one of the views on film strip 33, a beam 71 of coherent light is directed from laser 41, reflected by prism 62 and split by mirror 43 into two parts. One part is directed through collimating system 45 where it is diverged and collimated to form a reference beam 72 that is reflected by mirrors 64 and 65 and is incident on that part of photosensitive medium 60 that is located immediately behind slit 59 in mask 58.

The other part of the beam split by mirror 43 is reflected by prism 63 to projector 51. There it is directed by objective lens 52 through a view recorded on film strip 33 to form a subject beam 73 that is imaged by projecting lens 54 onto planar diffuse screen 56. Part of the subject beam 73 that is transmitted by diffuse screen 56 is incident on the part of photosensitive recording medium 60 located behind slit 59. Because reference beam 72 and subject beam 73 are derived from the same beam 71 of coherent light, the two beams are phase related and can interfere. The resulting interference pattern is recorded on a portion of medium 60 and this portion constitutes a hologram of the view on film strip 33. Because slit 59 is illustratively a vertical strip, the shape of the hologram is relatively long and narrow.

After the first hologram is recorded, beam 71 is momentarily interrupted while film strip 33 is advanced to the next view and mask 58 is moved a distance equal to the width of slit 59 so as to cover that area of medium 60 on which the first hologram was recorded. A hologram of the second view is now recorded following the same procedure as that detailed above; and this process is repeated as many times as is necessary to record holograms of each of the views on film strip 33. Of course, in recording the holograms care must be taken to ensure that the position of the holograms with respect to one another on the recording medium 60 of FIG. 4 is the same as the position of the views with respect to one another in FIG. 2.

Once all the individual holograms have been recorded, the record on photosensitive medium 60, which is called a composite hologram, is developed if necessary and is then ready for viewing. Typical viewing apparatus, shown in FIG. 5, comprises a source of light 81, a monochromatic filter 83, and the composite hologram indicated as element 85. A series of vertical lines defines the individual holograms that comprise composite hologram 85. To view the composite hologram, an illuminating beam 82 is directed from source 81 through filter 83, which renders beam 82 monochromatic, to hologram 85 where it is ordinarily incident at approximately the same angle reference beam 72 was incident on photosensitive medium 60 during formation of the composite hologram. A viewer located as shown in FIG. 5 then sees a virtual image 87 of the object represented by the mathematical description stored in the computer. As indicated in FIGS. 4 and 5, the distance D of image 87 from hologram 85 is approximately the same as the distance D of recording medium 60 from diffuse screen 56.

Because each of the holograms in composite hologram 85 is quite narrow, each eye of the viewer sees image 87 through a different one of the holograms in composite hologram 85. Because each hologram is a hologram of a different view, this means that each eye sees a slightly different view; but because the two views are in proper order, they are fused in the brain into one image that appears to the viewer to be a three-dimensional object. Consequently, the viewer is able to see depth in the image he views. Moreover, because the composite hologram is comprised of a multitude of holograms, the viewer is able to see the image from different viewpoints simply by changing the angle at which he views the composite hologram. And in part because each hologram is a recording of a view that is only slightly different from that recorded on the adjacent holograms and in part because the viewer's eyes are always flickering about even when viewing an image, the transition from one viewpoint to another is often imperceptible.

One potentially useful property of the image produced from the composite hologram is the fact that under certain conditions the real image reconstructed from the hologram is three-dimensional, by which is meant that different planes in the reconstructed real image focus at different distances from the hologram. Thus, while the real image is reconstructed in a plane located the same distance from the hologram as diffuse screen 56 of FIG. 4 was from photosensitive medium 60 when the hologram was formed, the real image is in focus at any distance less than a determinable distance $\Delta Z$ from the image plane. In Born and Wolf, *Principles of Optics*, page 441 (Third Revised Edition, 1965), the focal tolerance is given for a circular aperture as:

$$\Delta Z \approx 1/2\ (D/a)^2 \Lambda$$

where $D$ is the distance from hologram to image plane, $a$ is the diameter of the aperture and $\Lambda$ is the wavelength of the illuminating light. For a calculation of the focal tolerance in the real image reconstructed from the composite hologram, the above equation applies if each individual hologram is thought of as having a circular shape with a diameter $a$.

Figure 8:
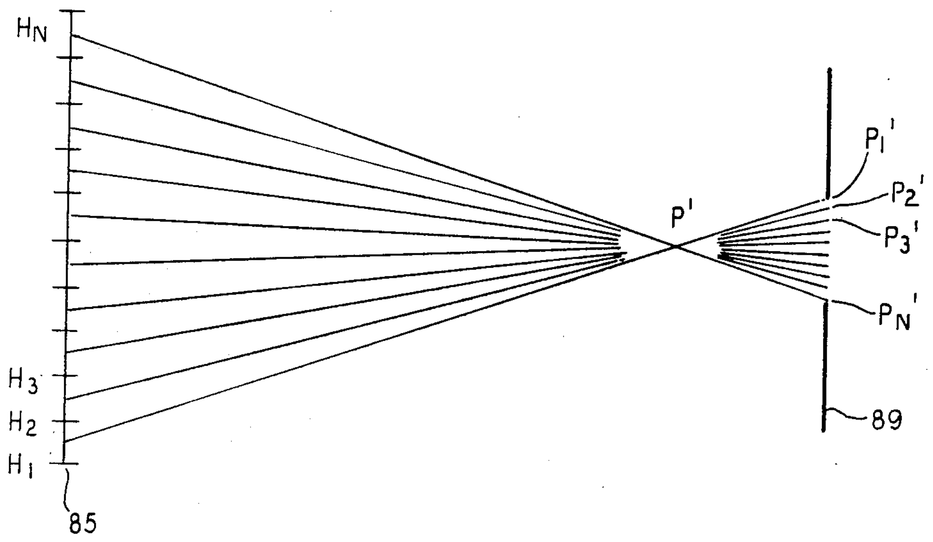
FIG. 8 is another schematic illustration of the reconstruction of an image from a hologram.

Because of this focal tolerance, it is possible to have three-dimensional images as will become clearer from a consideration of FIG. 8, which depicts a top view of the reconstruction of the real image from hologram 85. When illuminated from the left side of the drawing, each of the individual holograms that comprise composite hologram 85 reconstructs in image plane 89 a real image of the view used in forming the hologram. Because the information used in forming the views represents a three-dimensional object, these views are different and the real images of these views are different. Consequently, the images of the views do not coincide, a condition illustrated in FIG. 8 for a single point P in each of these images where points $P_1'$, $P_2'$, . . . , $P_N'$ in image plane 89 represent the reconstruction of point P in the image plane by individual holograms $H_1'$, $H_2'$, . . . , $H_N'$, respectively, of composite hologram 85. Though these points do not coincide in the image plane, the light from each hologram to its reconstruction of point P does intersect at point P'. And because P' is the only point where all the images of P are coincident, the viewer perceives the image of P as located at P' instead of in the image plane. Moreover, if P' is also within the focal tolerance of the image plane 89, a sharp image of point P will actually be in focus at P'. Thus, if composite hologram 85 is made up of N individual holograms, then the light intensity at P' will be N times greater than the light intensity at any one of the points $P_1'$, $P_2'$, . . . , $P_N'$. on image plane 89.

Obviously, similar considerations apply for each of the other points in the image reconstructed from hologram 85, and it can therefore be said that the reconstructed image is three-dimensional. Experimental verification of the three-dimensional quality of the image was provided by using a lens to image the image reconstructed from the hologram onto a ground glass screen and by moving the screen within the image. As expected, I found that the front and back of the image were in sharpest focus at different distances of the ground glass screen from the imaging lens. Uses for a three-dimensional image can be found wherever it is desirable to concentrate light into a three-dimensional pattern.

In practicing my invention I have formed several holograms of computer-generated random line patterns and multidimensional graphs. In forming these holograms, I first derived from the information stored in the computer 191 different views of the object from along one arc, the derivations using an angular difference between adjacent views of 0.306°. Each view was plotted on a frame of 35 millimeter microfilm, and each frame was illuminated with a laser to form a hologram. In forming the hologram, each frame was projected onto the diffuse screen with a magnification of 8 and was recorded on a 0.1066 centimeter wide portion of the photosensitive medium located 20 centimeters from the diffuse screen. Consequently, the total width of the hologram was about 20.3 centimeters, and the angle of view was approximately 58.4°. The height of the hologram was about 10 centimeters. In contrast to prior art computer-generated holograms that require up to 30 minutes of computer time to calculate a crude hologram and considerably longer to calculate a good one, the amount of computer time required to compute the views that were used in forming the composite hologram was less than 20 seconds.

When such a composite hologram is viewed so that its individual holograms are side-by-side in a horizontal direction, the image that is seen has horizontal parallax but no vertical parallax. Ordinarily, the absence of vertical parallax is hardly noticed by the viewer because he is likely to move his head from side to side when viewing the hologram but he is not likely to move his head up and down. If, however, it is desired that the image exhibit vertical parallax as well as horizontal parallax, it is only necessary to compute additional views of the object represented by the information stored in the computer. Thus, instead of computing just one row of views represented by the picture planes 231, 232, . . . , 23N of FIG. 2, several rows of views, one on top of the other, are computed and stored on the microfilm. Illustratively, all the views in a given row are stored on successive frames of the microfilm and the frames of one row follow the frames of the row above it.

To record all these views on the hologram, a mask is used that has only a small aquare or rectangular transparent region. For each row of views, the mask is translated in a horizontal direction across the face of the photographs and hologram recordings are made as detailed in the description of FIG. 4. After each row is completed, the mask is translated in a vertical direction a sufficient distance to locate the holograms of the next row of views in the proper spatial relationship with the other rows of holograms. For the illustrative storage pattern described above, after each row of holograms is recorded the mask is simply translated toward the bottom of the photosensitive medium a distance equal to the dimension of its transparent region in the direction of translation.

As shown in FIG. 5, the composite hologram formed with the apparatus of FIG. 4 is viewed in monochromatic light. This is necessary with the hologram depicted in FIG. 5 because each frequency of light reconstructs the image from the hologram with a different magnification, a phenomenon that results in a blur of many images of different sizes all superimposed on one another. However, because it is not always convenient to illuminate a hologram with monochromatic light under non-laboratory conditions, I have devised a preferred technique by which the user can reconstruct high-efficiency transmission holograms with only a high intensity light bulb. First, I copy the composite hologram with the apparatus of FIG. 6. This apparatus is comprised of a laser 91, a beam splitter 93, a collimating system 95, the composite hologram, here shown as element 101, reflecting prism 102, a diverging system 103 and a photosensitive recording medium 107. Collimating system 95 is comprised of an objective lens 96, a pinhole 97 and a collimating lens 98; and diverging system 103 is comprised of an objective lens 104 and a pinhole 105. Recording medium 107 is located the same distance D from hologram 101 as photosensitive medium 60 was from diffuse screen 56 during formation of the hologram as detailed in conjunction with FIG. 4. For reasons that will be detailed below, recording medium 107 should be a material such as dichromated gelatin that has a large enough dynamic range that its recording properties remain linear over a wide range of exposure intensities. Further information on dichromated gelatin may be found in the patents of T. A. Shankoff, number 3,567,444 issued Mar. 2, 1971 and L. H. Lin, number 3,617,274 issued Nov. 2, 1971 both of which are assigned to Bell Telephone Laboratories, Incorporated.

To copy composite hologram 101, a beam 92 of coherent light is directed from laser 91 and split by beam splitter 93 into two parts. One part is directed through collimating system 95 where it is diverged and collimated to form an illuminating beam 99 that is incident on hologram 101. Each of the individual holograms in hologram 101 diffracts this beam to form on recording medium 107 a real image 109 of the object stored in the hologram. Simultaneously, the other part of the light from beam splitter 93 is diverged by diverging system 103 to form a reference beam 106 that is also incident on photosensitive recording medium 107. Because illuminating beam 99 and reference beam 106 are derived from the same beam 92 of coherent light, the two beams are phase related and can interfere. And inasmuch as this interference is between a reference beam and the light that forms images of what is stored in the individual holograms of composite hologram 101, the resulting interference pattern is called an image hologram.

Because each image 109 is the image of a view that is transmitted through planar diffuse screen 56 of FIG. 4, each image 109 is substantially flat and coincides with the plane of photosensitive medium 107. Consequently, several images, all similar enough to be fused by the brain into one image, are stored in the same portion of photosensitive medium 107, a condition that requires a medium such as dichromated gelatin which has a large dynamic range. However, it can be shown that those parts of image 109 that are in the plane of recording medium 107 and the resulting image hologram do not become magnified regardless of the frequency at which they are illuminated. Hence, the entire image can be reconstructed in white light without blurring.

Figure 7:
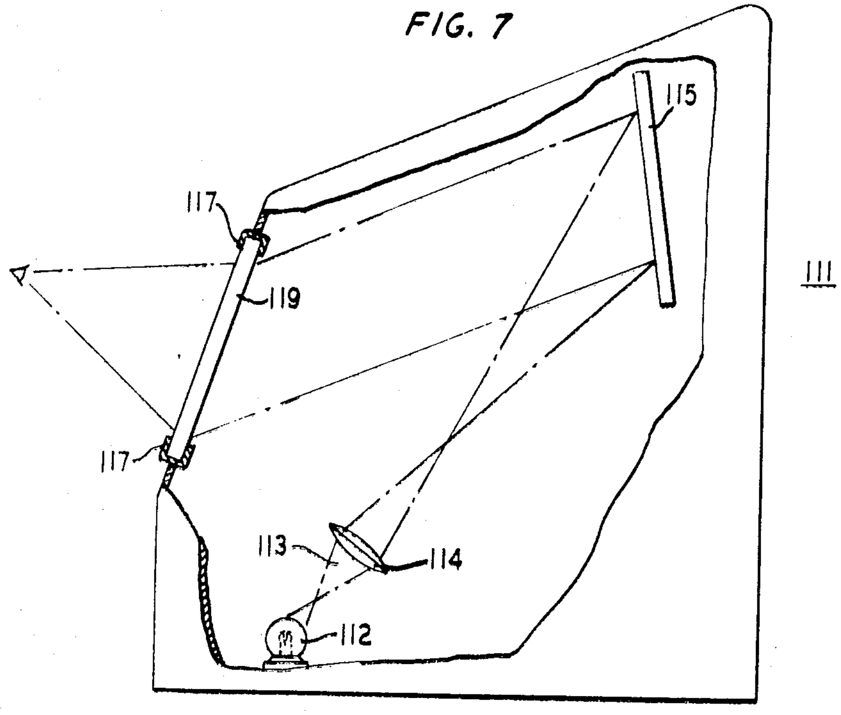
FIG. 7 is a cutaway view of a hologram viewing device.

A desktop viewer 111 suitable for such reconstruction is shown in FIG. 7. The viewer is comprised of a high intensity lamp 112, such as a GE841 lamp, a lens 114, a mirror 115 and mounting brackets 117. To view the image hologram, here shown as element 119, the hologram is inserted into mounting brackets 117. A light beam 113 from lamp 112 is then focused by lens 114 onto hologram 119 after being reflected by mirror 115. A viewer situate as shown then observes an image similar to the image that can be reconstructed with the apparatus of FIG. 5. However, because the image hologram is viewed in white light, the image can be made much brighter than any image reconstructed with a penlight and monochromatic filter — so bright, in fact, that the image can readily be observed in a well lighted room.

Figure 6:
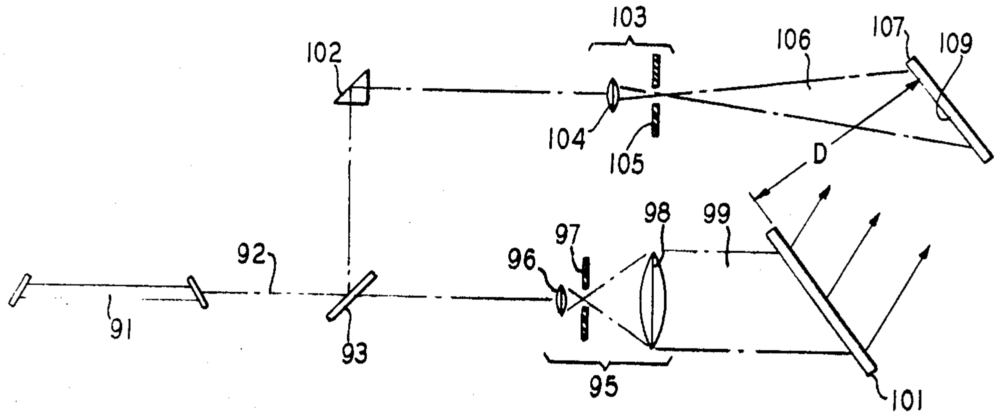
FIG. 6 is a schematic illustration of a hologram copying system.

Still another advantage of the image hologram is the fact that the dimensions of the image hologram need be no larger than the dimensions of the reconstructed image. Thus, no matter how large composite hologram 101 of FIG. 6 is, photosensitive medium 107 only need be as large as the image reconstructed from composite hologram 101 for the image hologram to record all the information recorded in composite hologram 101. In brief, the formation of the image hologram is a powerful technique for increasing the storage capacity of a hologram. Moreover, this property of the image hologram also makes it possible to use a uniform size image hologram in desktop viewer 111 because as long as the reconstructed images remain smaller than the size of the image hologram the image hologram can record different numbers of views of the computer stored object on the same size recording medium.

Clearly, many modifications can be made in the above system within the spirit and scope of the invention. The techniques disclosed can be adapted to form holograms of any kind of view the computer can generate. For example, if the computer is used to form color views of the object stored in its memory, the well-known principles of color holography can be adapted to my invention to form a hologram that can reconstruct a color image.

Likewise, although the microfilm plotter is presently the preferred means for recording the views produced by the computer, other means may become preferable as other computer equipment is developed.

The hologram recording apparatus shown in FIG. 4 is illustrative of present laboratory setups. For efficient production of composite holograms, however, the apparatus should preferably be mechanized for quick and precise advancing of the microfilm and stepping of the mask. Obviously, numerous modifications can also be made in the optical systems described and in the physical arrangement of the elements of the apparatus. Similarly, many modifications can be made in the copying apparatus shown in FIG. 6 and in the viewing arrangements shown in FIGS. 5 and 7. Any photosensitive medium suitable for recording holograms can be used in recording the holograms, but as mentioned above, I prefer to use dichromated gelatin for recording the image hologram.

As was the case in my aforementioned patent application, this invention can also be practiced with the techniques of integral photography. In such a case, the views are produced from the computer just as they are produced for holographic recording; and an integral photograph is made with apparatus similar to that shown in FIG. 4 except for the following differences. Because integral photography does not record interference patterns between light waves, a coherent light source is not necessary and no reference beam is necessary. Instead, a fly's eye lens or lenticular screen is inserted between the mask and the photosensitive medium. Thus, an integral photograph is recorded simply by illuminating the microfilm frame, imaging light from the frame onto the diffuse screen, and recording on a portion of the photosensitive medium some of the light that traverses the diffuse screen. For further details, please see my aforementioned patent application where there is described a closely similar adaption of hologram forming apparatus to integral photography.

As is well known in the art, an integral photograph may be viewed by directing light through the photograph and then through a fly's eye lens that is the optical equivalent of the fly's eye lens used in forming the integral photograph.

In summary, I have devised a computer display system that uses a computer to calculate and a microfilm plotter to display a multitude of two-dimensional views of whatever three-dimensional object is to be displayed. These views are then recorded sequentially by holographic techniques; and the resulting hologram can then be viewed or, preferably, used to form an image hologram suitable for viewing. Because the computer is used only to do what it does best, namely, calculate two-dimensional views of an object, the amount of computer time required in forming my hologram is far less than that required in the prior art. And because an image hologram is preferably used for viewing the image, the image can be reconstructed and viewed in ambient light.

What is claimed is:

1. A method for forming a hologram that can be illuminated to form an optical image of an object comprising the steps of:

calculating two-dimensional projections of how the object would appear from at least two different views on a single line and plotting said projections on a display medium to form at least a first representation and a second representation of the object;

illuminating the first representation, forming its image on a diffuse screen, and interfering on a first portion of a photosensitive recording medium both light from the image of the first representation of the object and coherent reference light, whereby a first hologram is recorded on the photosensitive medium; and subsequently illuminating the second representation, forming its image on the diffuse screen, and interfering on a second portion of the photosensitive recording medium aligned with the first portion both light from the image of the second representation of the object and coherent reference light, whereby a second hologram is recorded on the photosensitive medium, the alignment of the first and second holograms on the photosensitive recording medium being such that when the holograms are viewed a viewer can perceive an image of the object that appears to be three-dimensional.

2. An image hologram that can be illuminated to form an optical image of an object, said hologram being made by the steps of:

calculating two-dimensional projections of how the object would appear from at least two different angles of view and plotting said projections on a display medium to form at least a first representation and a second representation of the object;

interfering on a first portion of a first photosensitive medium both light from the first representation of the object and coherent reference light, whereby a first hologram is recorded on the first photosensitive medium;

interfering on a second portion of the first photosensitive medium both light from the second representation of the object and coherent reference light, whereby a second hologram is recorded on the first photosensitive medium; and interfering on a second photosensitive medium both coherent reference light and real images reconstructed from the holograms recorded on the first photosensitive medium to form an image hologram.

3. The method of claim 2 wherein the different portions of the first photosensitive medium are defined by a transparent region in an otherwise opaque mask and the method further comprises the step of moving the mask after the first hologram is recorded to cover up the first portion of the photosensitive medium.

4. The method of claim 2 wherein the two-dimensional projections are imaged in turn onto a back projection screen and light from the images on the back projection screen is interfered with coherent reference light to form the holograms on the first photosensitive medium.

5. The method of claim 4 wherein the different portions of the first photosensitive medium are defined by a transparent region in an otherwise opaque mask and the method further comprises the step of moving the mask after the first hologram is recorded to cover up the first portion of the photosensitive medium.

6. A hologram formed by the method of claim 1.

7. A method for forming an image hologram that can be illuminated to form an optical image of an object comprising the steps of:

calculating two-dimensional projections of how the object would appear from at least two different angles of view and plotting said projections on a display medium to form at least a first representation and a second representation of the object;

interfering on a first portion of a first photosensitive medium both light from the first representation of the object and coherent reference light, whereby a first hologram is recorded on the photosensitive medium; and interfering on a second portion of the first photosensitive medium both light from the second representation of the object and coherent reference light, whereby a second hologram is recorded on the photosensitive medium; and interfering on a second photosensitive medium both coherent reference light and real images reconstructed from the holograms recorded on the first photosensitive medium, the real images being centered on the second photosensitive medium.

8. A method of producing a composite hologram, comprising forming a plurality of two-dimensional images of an object from different points on a single line in a plane, sequentially projecting said images on substantially the same areas of an image screen with coherent radiation, and holographically recording each of said projected two dimensional images from said screen on separate areas of a recording medium as a plurality of horizontally aligned juxtaposed individual holograms in relative positions corresponding to the positions from which said two-dimensional images were formed.

9. A method of producing a composite hologram comprising forming a plurality of two-dimensional images of an object corresponding to different views of such object at different points along a line, sequentially projecting said images on substantially the same areas of an image screen with coherent radiation, and holographically recording each of said projected two-dimensional images from said screen on separate areas of a recording medium as a plurality of horizontally aligned juxtaposed individual holograms in relative positions corresponding to the positions from which said two-dimensional images are formed.

* * * * *